Nov. 7, 1944. R. G. ALLEN 2,362,427
MOLD OPERATING MECHANISM FOR GLASS BLOWING MACHINES
Filed Jan. 7, 1942 5 Sheets-Sheet 1

R. G. Allen
INVENTOR

BY
ATTORNEYS

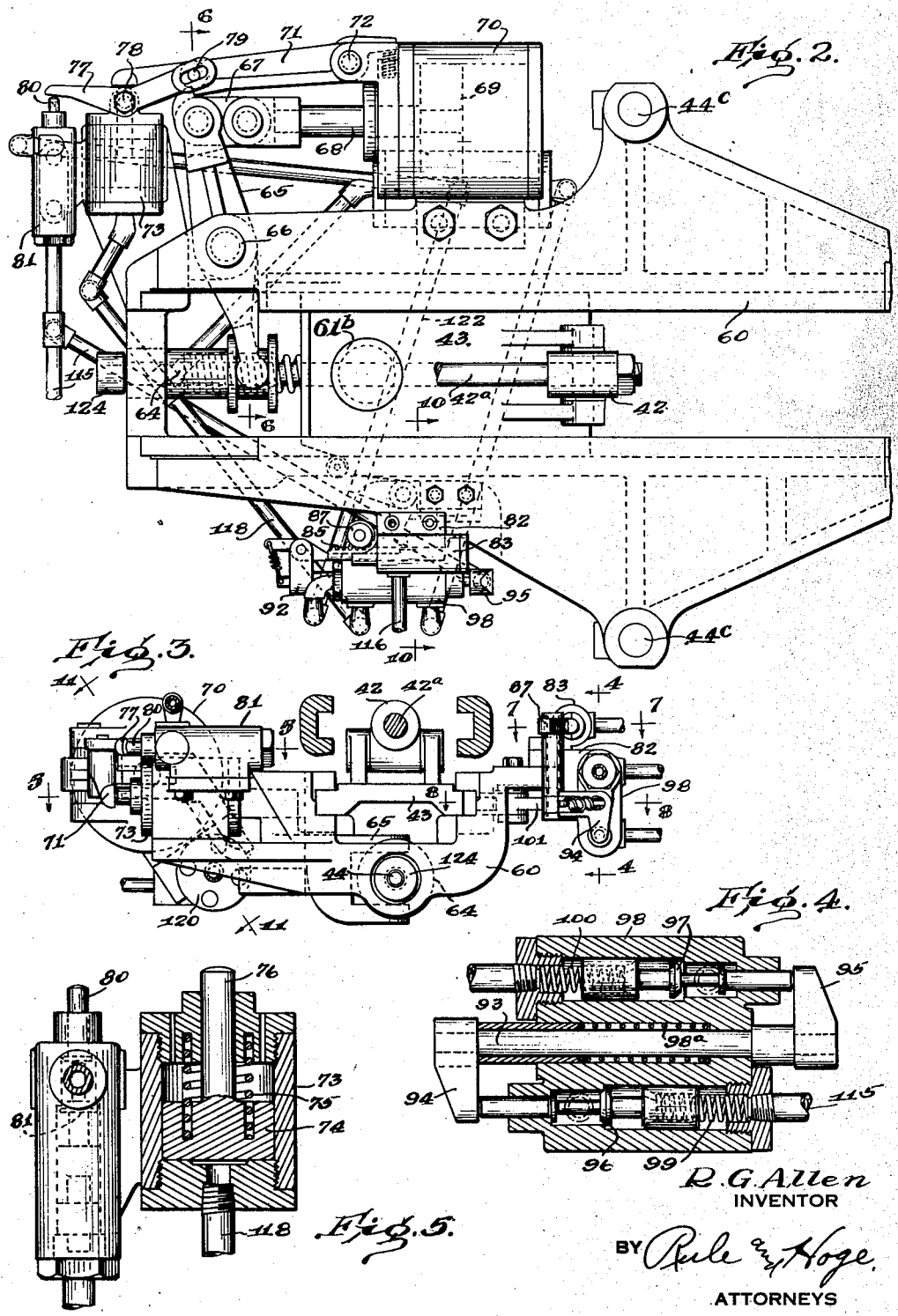

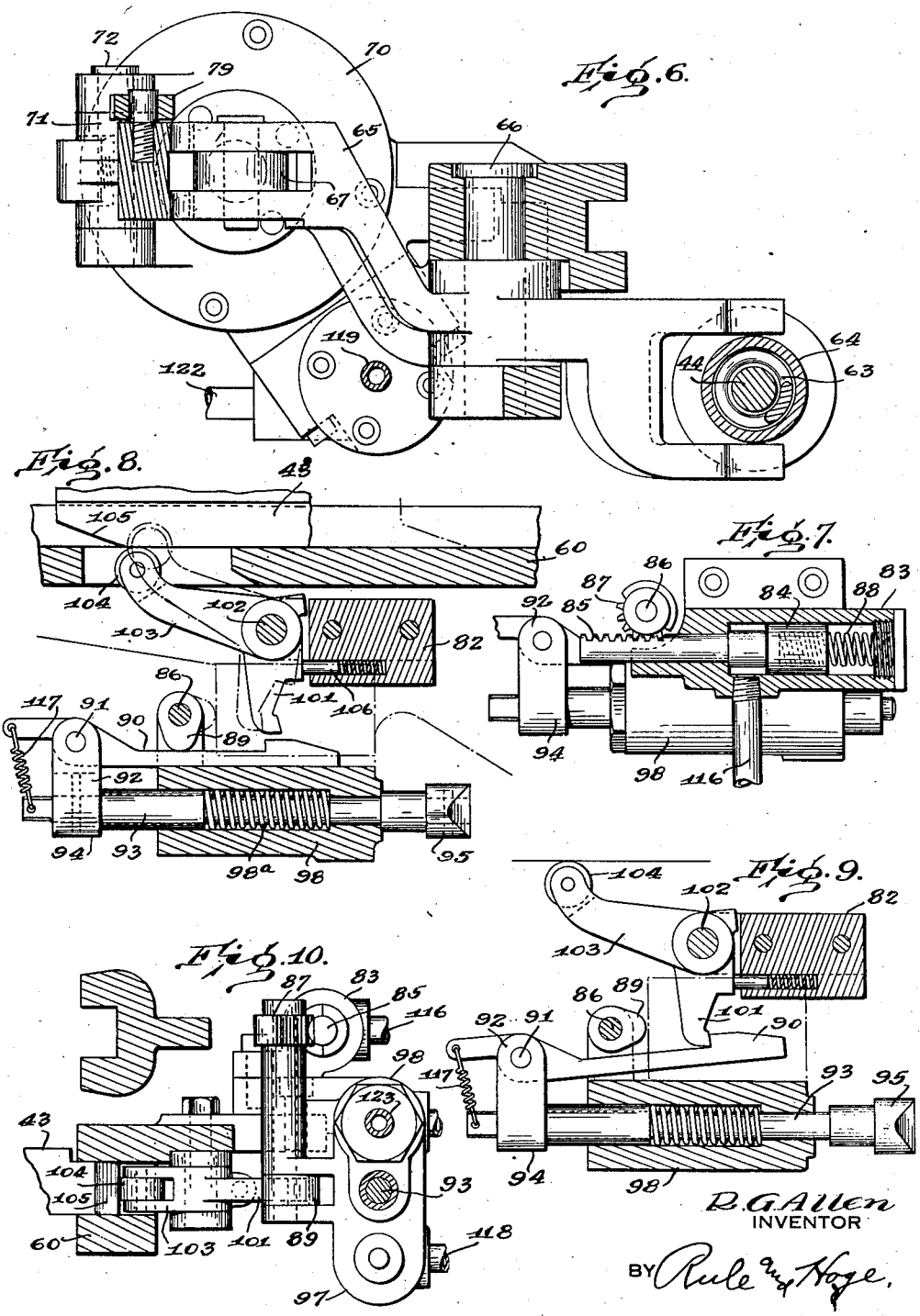

Nov. 7, 1944.   R. G. ALLEN   2,362,427
MOLD OPERATING MECHANISM FOR GLASS BLOWING MACHINES
Filed Jan. 7, 1942   5 Sheets-Sheet 4
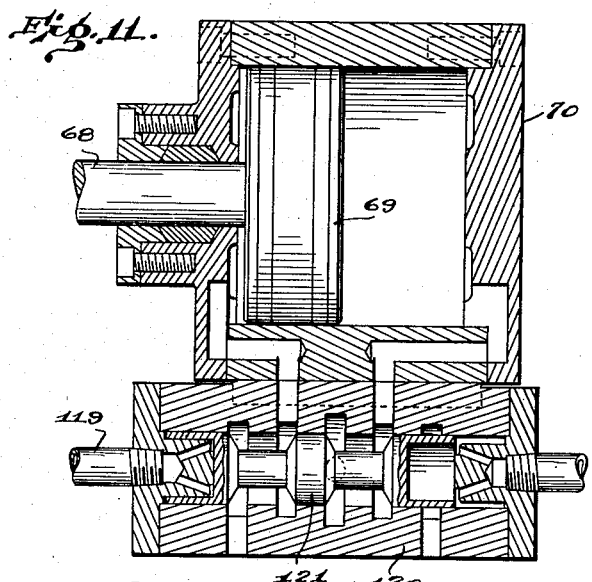
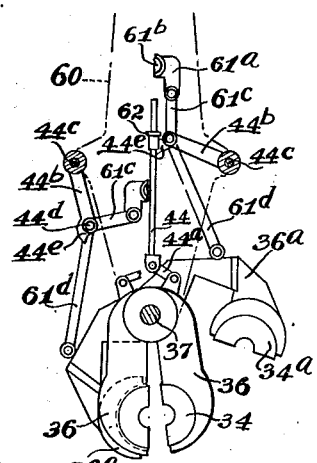
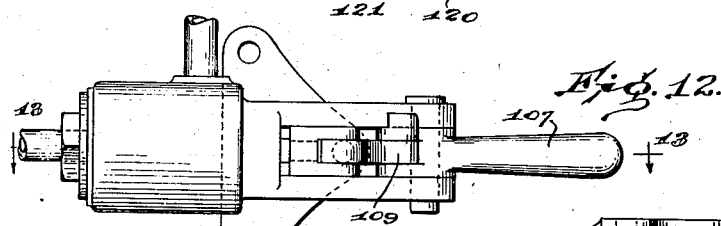
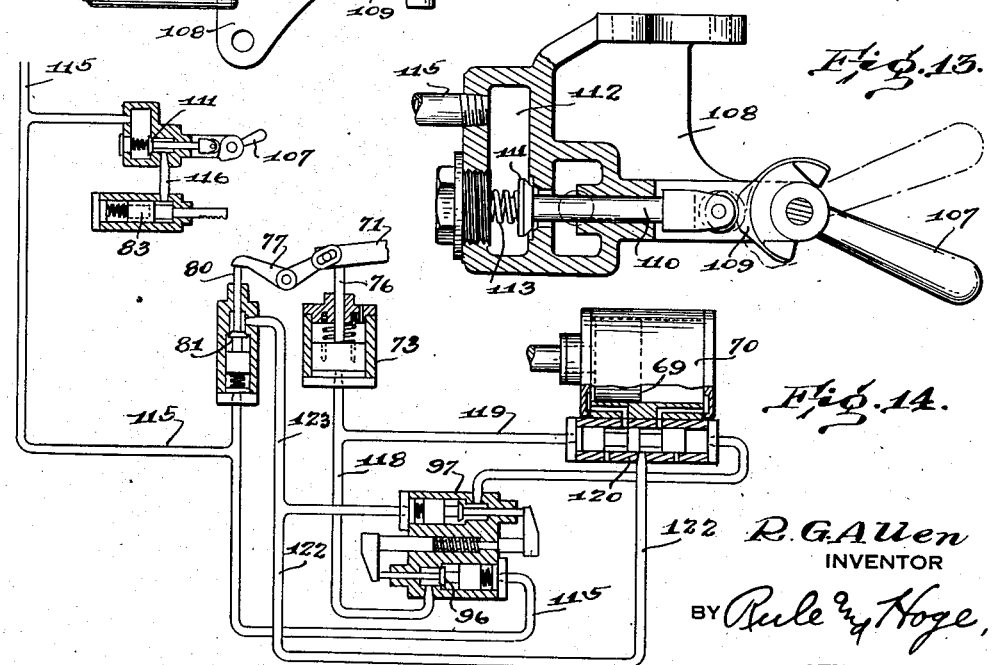
R. G. Allen
INVENTOR
BY Rule & Hoge,
ATTORNEYS Patented Nov. 7, 1944

2,362,427

UNITED STATES PATENT OFFICE 2,362,427

MOLD OPERATING MECHANISM FOR GLASS BLOWING MACHINES

Russell G. Allen, Alton, Ill., assignor to Owens-Illinois Glass Company, a corporation of Ohio Application January 7, 1942, Serial No. 425,840

12 Claims. (Cl. 49—42)

My invention relates to machines for blowing glassware such as bottles, jars and other hollow articles, and comprises means to facilitate changing of the molds while the machine is in operation. The invention as herein illustrated is embodied in a automatic glass blowing machine of the Owens suction gathering type, comprising a mold carriage which rotates continuously about a vertical axis and a series of heads or units rotating with the carriage. Each unit includes a mold group comprising a partible neck mold, a partible blank mold adapted to register with the neck mold, and a partible finishing mold. The blank mold is positioned beneath the neck mold and when closed, registers with the closed neck mold to form a parison mold which is periodically lowered into contact with a pool of molten glass from which charges of glass are drawn into the mold. After the parison has been formed, the blank mold is opened, leaving the parison suspended from the neck mold. The finishing mold is then swung upward and closed around the parison and the latter blown to finished form therein. Thereafter the neck mold is opened and the finishing mold with the blown article therein is swung downward in order to clear the pot from which the glass has been drawn. After passing the pot, the finishing mold is swung upward to an intermediate position and opened to discharge the blown article.

In machines of this type it is frequently necessary to change certain molds or an entire set of molds and it is highly desirable to provide means permitting the molds to be changed while the machine is running. Where it becomes necessary to stop the machine for changing molds, production is interfered with owing to the time which is lost while the machine is not running and the further time required for re-establishing temperature and operating conditions after the machine is again started.

In machines of the type indicated, the time interval during each rotation of the mold carriage, permitted for changing the blank and neck molds, is short and often insufficient to allow the removal or replacing of molds. The neck molds are only opened for a short time as required to release the blanks.

An object of the present invention is to provide manually controlled means for holding the blank and neck molds open and in accessible position a sufficient length of time to permit changing them without stopping or slowing down the machine.

A further object of the invention is to provide control mechanism individual to the mold groups whereby the blank and neck molds of any selected mold group may be thrown out of operation in a manner to permit changing the molds without interfering with the continued normal operation of the other mold groups.

Other objects of the invention will appear hereinafter.

The present application discloses subject matter relating to the control of the molds for mold changing operations, disclosed and claimed in my copending application, Serial Number 425,838, filed January 7, 1942, Glass blowing machines.

Referring to the accompanying drawings which illustrate the invention as applied to a machine of the Owens type for blowing bottles and other hollow ware:

Fig. 1 is a sectional elevation of the machine, parts being broken away, showing one head or unit.

Figs. 2 to 11 inclusive illustrate the mechanism for controlling the opening and closing movements of the blank and neck molds when a unit is set for a mold changing operation.

Fig. 2 is a plan view showing a cam operated slide for opening and closing the blank mold and neck mold, and control devices for controlling the opening and closing of the molds in a manner to permit changing of the molds while the machine is running.

Fig. 3 is a cross-sectional view of the mechanism shown in Fig. 2.

Fig. 4 is a section at the line 4—4 on Fig. 3, showing valves and their operating means.

Fig. 5 is a section at the line 5—5 on Fig. 3, showing a piston motor and a valve controlled thereby.

Fig. 6 is a section at the line 6—6 on Fig. 2.

Fig. 7 is a section at the line 7—7 on Fig. 3.

Fig 8 is a section at the line 8—8 on Fig. 3.

Fig. 9 is a view similar to Fig. 8, but showing the parts in a different relative position.

Fig. 10 is a section at the line 10—10 on Fig. 2.

Fig. 11 is a section at the line 11—11 on Fig. 3.

Fig. 12 is a plan view of a manual control lever herein referred to as an air valve lever, to operate the valve shown in Fig. 13 and thereby set the apparatus for a mold changing operation.

Fig. 13 is a section at the line 13—13 on Fig. 12.

Fig. 14 is a diagrammatic view of the pneumatic control system, the air motors and control valves being shown in section.

Fig. 16 is a plan view of a blank mold and neck mold with linkage for opening and closing the molds, one section of each mold being shown retracted and the other in mold closing position.

Figure 1:
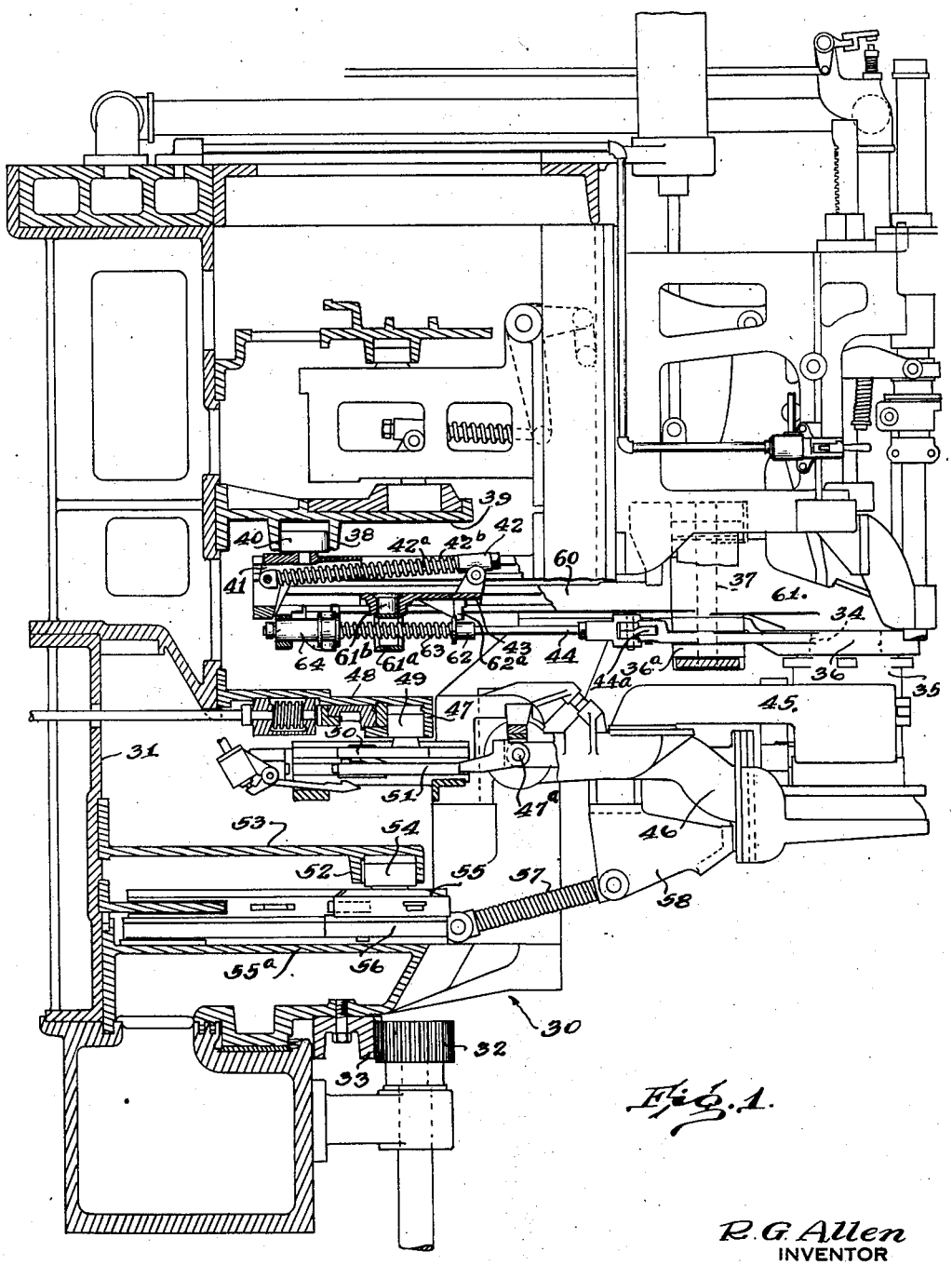

Referring particularly to Fig. 1, the machine comprises a mold carriage 30 mounted for continuous rotation about the vertical axis of a stationary center column 31. The carriage may be rotated by an electric motor having driving connections with the carriage through a train of gearing including a pinion 32 which runs in mesh with a ring gear 33 on the carriage. A plurality of heads or units which may be arranged in an annular series on the mold carriage, each comprises a mold group including a blank mold 34a (Figs. 15, 16), a neck mold 34, and a finishing mold 35. The molds and their operating mechanisms may be in the main of conventional construction and operation, except as such mechanisms are modified to cooperate with means comprised in the present invention for controlling the mold movements to facilitate mold changing operations. For a full disclosure of an Owens type of machine, reference may be had to the patent to La France #1,185,687, June 6, 1916. Reference may also be had to the Allen Patent 2,269,391, January 6, 1942, Machine for molding glass articles, which discloses a machine of substantially the same construction as that to which the present invention is applied, as herein illustrated.

The neck mold sections 34 (Figs. 1 and 16) are carried on arms 36 mounted to swing about a pivot pin 37 for opening and closing the neck mold. The blank mold sections 34a are in like manner carried on arms 36a mounted to swing on the pin 37. These movements of the blank mold and neck mold are controlled by a stationary cam track 38 formed on a cam plate 39. A cam roll 40, running on the cam track 38, is carried by an upper slide 41 having a yielding connection with a lower slide 43. Said connection includes a rod 42a slidable in a connector 42, and compression spring 42b coiled on the rod. The slide 43 has operating connection with the blank and neck mold carrying arms for opening and closing the molds as hereinafter described. The opening and closing of the neck mold is effected by a neck mold cam 38a (Fig. 15) which forms a part of the blank mold cam 38.

The finishing mold sections 35 are carried on arms 45 pivotally mounted for swinging movement on a frame 46 herein referred to as the finishing mold carrier. Said frame is mounted as usual to swing up and down about a horizontal axis 47a for lifting the finishing mold into register with the neck mold 34 and for lowering the finishing mold.

The opening and closing movements of the finishing mold are under the control of a stationary cam track 47 formed on a cam plate 48. A cam roll 49 running on the cam track, is carried on an upper slide 50 which has operating connections through a lower slide 51, with the mold swinging arms 45.

The up and down swinging movements of the finishing mold carrier 46 are controlled by a cam track 52 on a stationary cam plate 53. A cam roll 54 running on the cam 52 is carried by an upper slide 55 operatively connected to a lower slide 56. The latter has a link connection 57 with a bracket 58 fixed to and forming a part of the mold carrier 46. The slides 55 and 56 are mounted to reciprocate in a slide frame 55a.

Figure 15:
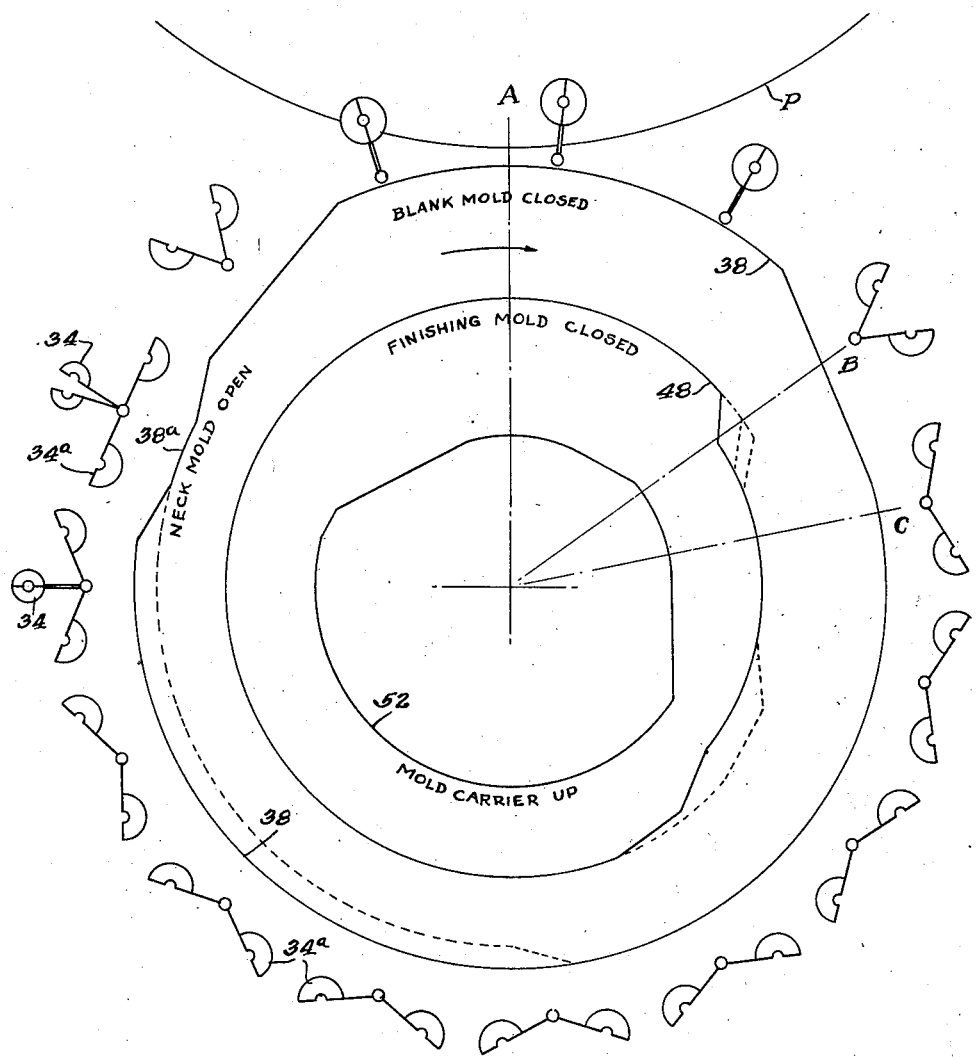
Fig. 15 is a cam chart.

The order of sequence in which the mold movements taken place is indicated by the cam chart (Fig. 15). When a mold group is in the position indicated by the radial line A, the parison mold (including blank mold 34a and neck mold 34) is over the gathering pot P and in dip for gathering a charge of glass, the blank mold being closed and in register with the closed neck mold. As the mold group advances, the blank mold commences to open, being partly opened when at the position B and wide open when the position C is reached, leaving the parison depending from the neck mold while the finishing mold swings up in the usual manner and is closed around the suspended parison. The blank mold remains open under the control of its cam 38 until the neck mold section 38a is reached when it is given an additional opening movement which operates to open the neck mold 34, thereby releasing the parison which, in the meantime has been blown to finished form within the finishing mold.

If the control means is set as hereinafter described, to permit changing of the molds, the blank mold when it reaches the position C, is automatically opened to its widest position and thereby opens the neck mold in the manner hereinafter described. The molds are then held open independently of the blank and neck mold opening cam 38, 38a, thereby permitting the molds to be changed.

The mechanism for controlling the movements of the blank and neck molds will now be described.

The lower slide 43 is mounted in a slide plate 60 (Fig. 2) for reciprocating movement toward and from the center of the machine for opening and closing the blank and neck molds. The plate 60 is secured to the dip frame 61 (Fig. 1) by which the mold is lowered and lifted to and from the glass in the gathering pot or tank.

Operating connections between the slide 43 and the blank mold, include a yoke 61a (Figs. 1 and 16) attached by a pin 61b to the under side of the slide 43, and connected through links 61c and 61d to the blank mold arms 36a. Outward movement of the slide 43 operates through this linkage to swing the blank mold sections from open position, shown at the right in Fig. 16, to the closed position shown at the left in said figure. Operating connections between the slide 43 and the neck mold include a rod 44 with a flanged collar 62 pinned thereto in the path of a boss 62a on the slide 43. The outer end of the rod 44 is connected through links 44a (Fig. 16) to the neck mold arms 36. Rock arms 44b are connected at their outer ends by pivots 44c to the plate 60 and at their inner ends to pivot pins 44d which also connect the links 61c, 61d.

During normal operation, as the cam 38 draws the slide 41 inwardly toward the center of the machine, it operates through the rod 42a to draw the slide 43 inwardly and thereby opens the blank mold. During the final opening movement of the blank mold, the boss 62a engages the collar 62 and moves the rod 44 inwardly, thereby opening the neck mold. The neck mold is held closed prior to such opening movement by a spring 63 (Fig. 1) held under compression between said collar and a sleeve 64 (Figs. 1 and 2) slidably mounted on the rod, said sleeve also being slidable lengthwise in the end of the plate 60.

During the normal operation of the machine, the sleeve 64 is held in the position shown in Figs. 1 and 2 by a lever 65 pivoted at 66 on the plate 60. The lever 65 is operatively connected through a link 67 with the piston rod 68 and piston 69 of an air motor 70. The lever 65 is normally held in the position shown (Fig. 2)

by a latch 71 pivoted at 72 to the motor cylinder. The latch is released by the operation of an air motor 73 (Figs. 2, 5, and 14) operating in the manner hereinafter described. The motor 73 includes a piston 74 normally held in its inward position by a spring 75, said piston carrying a plunger 76, the outer end of which engages the latch arm 71 so that when the piston is moved outward, the latch is released from the lever 65. A lever 77, fulcrumed at 78 on the casing of the motor 73, has a slot and pin connection 79 with the latch arm 71. The outer end of the lever 77 engages a valve plunger 80 of a valve 81 (Figs. 5 and 14) mounted in a valve casing attached to the motor 73. When the plunger 76 is projected and releases the latch arm 71, the latter operates through the lever 77 to open the valve 81.

Referring to Figs. 2, 3, 8 and 9, a bracket 82, bolted to the plate 60, has mounted thereon an air motor 83 including a piston 84 (Fig. 7) connected to a rack bar 85. A rock shaft 86 journalled in the bracket 82 carries a segmental pinion 87 running in mesh with the rack 85. The rack bar is held in the position shown by a coil spring 88 behind the piston 84. The rock shaft 86 carries at its lower end a cam 89 (Figs. 8 and 10) which cooperates with a latch lever 90 pivoted at 91 in an arm 92 which is secured to a valve operating rod 93. As shown on Fig. 4, the rod 93 carries heads 94 and 95 attached to its opposite ends respectively, the head 94 being formed integral with the arm 92. Said heads are in engagement with valve operating plungers for opening valves 96 and 97 respectively. Said valves and the rod 93 are mounted in a valve casing 98 attached to or formed integral with the bracket 82. The rod 93 is normally held in the Fig. 4 position by a coil spring 98ª, in which position it holds the valve 97 open while the valve 96 is held closed by a spring 99. When the rod 93 is moved to the right as hereinafter described, it opens the valve 96 and permits the valve 97 to be closed by its spring 100.

The latch 90 (Figs. 8 and 9) cooperates with a dog 101 which rocks on a pivot pin 102 in the bracket 82. The dog is formed integrally with a rock arm 103 carrying a roll 104 which projects into the path of the slide 43. The slide is formed with a cam surface 105 which, when the slide 43 is moved inwardly, namely, toward the center of the machine, for opening the molds, swings the rock arm 103 and dog 101 into the full line position (Fig. 8), said dog and arm being returned to the broken line position by a spring actuated pin 106 when the slide is moved outwardly.

The operation of the cam 89 (Fig. 8) is manually controlled by the air valve lever 107 (Figs. 12, 13 and 14) mounted on a bracket 108 and formed with a cam 109 which, when the hand lever is lowered, moves a valve rod 110 inwardly and opens a valve 111 in a valve chamber 112. When the hand lever is lifted the valve is closed by a spring 113. An air pressure line 115 (Fig. 14) extends to the valve chamber so that when the valve 111 is opened, air pressure is supplied through a pipe 116 to the piston motor 83 which operates through the rack and pinion mechanism to swing the cam 89 and release the latch 90 (Fig. 9).

The operation of the above described control mechanism for the neck and blank molds is as follows: When the air valve lever 107 is thrown down to cause the cam 89 to withdraw and release the latch 90, as above described, the latch is swung outwardly by its spring 117 for cooperation with the dog 101. If at this time the slide 43 is in its outward position, or if not, then when the slide is moved outwardly so as to permit the dog 101 to move to the broken line position (Fig. 8), the latch 90 swings upward to engage the dog. When the slide 43 again moves inwardly and actuates the arm 103, the dog 101 is moved to the full line position and thereby moves the latch 90 bodily to the right a short distance, carrying with it the valve operating rod 93. This serves to reverse the valves 96 and 97 (Figs. 4 and 14). That is, the valve 96 is opened and the valve 97 is closed.

Referring to Fig. 14, it will be seen that the air pressure line 115 extends to the right hand end of the valve chamber of the valve 96 so that air under pressure is supplied through the valve and a pipe 118 leading therefrom to the lower end of the piston motor 73. The motor therefore operates the plunger 76 and swings the latch lever 71 (Fig. 2) to release the lever 65 and at the same time actuates the lever 77 and thus opens the valve 81. Air under pressure is also transmitted through the pipe 118 (Fig. 14) and a branch pipe 119 (Figs. 2, 11 and 14) to the left-hand end of a valve chamber 120 in which is mounted a valve 121 controlling the air supply to the motor 70. The air pressure through the pipe 119 moves the valve to the right and thereby opens communication through a pipe 122 to the left-hand end of the motor cylinder. At the same time the valve 81 is opened (as above described) by the lever 77, so that air under pressure is supplied therethrough to a pipe 123 and the pipe 122 to the motor 70 and moves the motor piston 69 to the right. The lever 65 (Fig. 2) is thus actuated and moves the sleeve 64 to the left. The sleeve 64 operates through a head 124 on the rod 44 to move the latter to the left or inwardly and thus moves the neck molds to open position and holds them open as long as air pressure is maintained in the motor 70 for holding the piston 69 in its air operated position. While the air pressure is maintained in the motor, the slide 41 may continue its inward travel when the neck mold opening cam 38ª (Fig. 15) is reached, but this is an idle movement. Evidently when the cam 38 moves the slide outwardly for closing the blank mold after traveling in open position with the mold carriage through a half revolution of the carriage, the cam 105 on the slide 43 (Fig. 8) will release the lever 103, permitting it to swing inwardly. This allows the spring 98ª to return the rod 93 to its original position, thereby closing the valve 96 and opening the valve 97 (Figs. 4 and 14). When the valve 96 is closed it cuts off and exhausts the air from the valve piston 121 (Fig. 11) and also from the air motor 73 (Figs. 2 and 5), thereby allowing the spring 75 to retract the piston 74 and plunger 76, but as the lever 65 is holding the latch 71 in its outer position, the air valve 81 is held open by the lever 77. At the same time that the valve 96 is closed the valve 97 is opened and allows air under pressure to enter the right-hand end of the valve 120 (Figs. 11 and 14), thereby forcing the piston 69 to the left, which operates to swing the lever 65 in a counter-clockwise direction. The lever thus forces the sleeve 64 (Figs. 1 and 2) and spring 63 to the right. The spring operates through the collar 62 to move the rod 44 to the right, thereby closing the neck molds 34. When the motor piston 69 reaches the end of its stroke, it allows the latch 71 to drop behind the lever 65 so that the neck molds are held closed for normal operation. When the latch 71 drops, it also actuates the lever 77, permitting the valve plunger 80 to move outwardly, thereby closing the valve 81 and cutting off the air supply through said valve. This cycle of operation is repeated during each revolution of the machine while the mold control valve 111 (Figs. 13 and 14) remains open.

Modifications may be resorted to within the spirit and scope of my invention.

I claim:

1. A machine for forming glass articles comprising a mold carriage, means for rotating the carriage, a mold mounted to rotate with the carriage, a stationary cam track, a cam follower roll running on the track, operating connections between said roll and the mold for opening and closing the mold at predetermined points during the rotation of the carriage, a piston motor, means actuated by said motor for holding the mold in open position independently of the cam and independently of the position of the cam follower roll while the said carriage is rotating and said roll running on the track and while the motor remains energized, and manual means for controlling the operation of said motor.

2. A machine for forming glass articles comprising a mold carriage, means for rotating the carriage, a mold mounted to rotate with the carriage, a stationary cam track, a cam follower roll running on the track, a slide, means including a spring providing an operating connection between said roll and slide, said slide being mounted on the carriage for movement radially thereof, operating connections between the slide and the mold, a piston motor, operating connections between the motor and said slide for holding the slide in position to hold the mold open while the carriage is rotating and while said motor is energized, and manual means for controlling the operation of the piston motor independently of the means for rotating the carriage.

3. A machine for forming glass articles comprising a mold carriage, means for rotating the carriage, a mold mounted to rotate with the carriage, a stationary cam track, a cam follower roll running on the track, a slide carrying said roll, a second slide operatively connected to the mold, means providing a yielding connection between said slides, a motor, and operating connections between the motor and said second slide for holding the latter in position to hold the mold open, said yielding connections permitting movement of said first mentioned slide under the control of the cam track while the mold is held open.

4. A machine for molding glass articles comprising a mold carriage mounted for rotation about a vertical axis, means for rotating the carriage, a sectional mold mounted on the carriage, a stationary cam track, a cam follower roll running on said track, a slide carrying said roll, a second slide, said slides being mounted on the carriage for reciprocating movement radially thereof, means providing a spring driving connection between the slides, means providing operating connections between said second slide and the mold for opening and closing the mold when said second slide is reciprocated, a piston motor, and operating connections between the piston motor and the mold for holding the mold open independently of the cam track and said roll carrying slide while said roll is running on the cam track.

5. An Owens type machine for forming hollow glass articles comprising in combination a mold carriage mounted for rotation about a vertical axis, means for continuously rotating the carriage, a sectional mold mounted on the carriage, a stationary cam track, a cam roll running on said track, a slide carrying said roll and mounted on the carriage for reciprocating movement radially thereof, a second slide, connections between said slides for causing the second slide to reciprocate with the first mentioned slide, operating connections between the second slide and the mold sections by which the mold is opened and closed when the slides are reciprocated, a piston motor mounted on the carriage, and operating connections between the motor piston and said second slide for holding the latter in position to hold the mold open when said motor piston is in one position, said connections between the slides including spring means permitting reciprocation of the first mentioned slide independently of the other slide.

6. An Owens type machine for forming hollow glass articles comprising in combination a mold carriage mounted for rotation about a vertical axis, means for continuously rotating the carriage, a sectional mold mounted on the carriage, a stationary cam track, a cam roll, a slide carrying said roll, a second slide, said slides mounted on the mold carriage to reciprocate radially thereof, spring means connecting said slides, operating connections between the second slide and the mold including a rod extending radially of the mold carriage, a sleeve mounted to reciprocate on said rod, a piston motor, a lever providing an operating connection between the motor piston and said sleeve, a latch for holding said lever in a predetermined position, a second motor, means for effecting the operation of said second motor, means actuated by said second motor for tripping said latch and permitting said first mentioned motor to actuate said sleeve when operating fluid is supplied to said first motor, and spring mean for returning said sleeve and resetting the latch when the fluid pressure supply is cut off from said first motor.

7. A machine for forming hollow glass articles comprising a mold carriage mounted for rotation about a vertical axis, a parison mold mounted thereon and including a sectional blank mold and a sectional neck mold, a stationary cam track, a cam follower roll running on said track, means providing operating connections between the roll and the blank mold for opening and closing the blank mold at predetermined points during its rotation with the carriage, neck mold opening mechanism cooperating with the blank mold opening, means for causing the neck mold to be opened by an opening movement of the blank mold, and manually controlled means operable to hold the blank and neck molds open independently of the cam track.

8. A machine for forming hollow glass articles comprising a mold carriage mounted for rotation about a vertical axis, a parison mold mounted thereon and including a sectional blank mold and a sectional neck mold, a stationary cam track, a cam follower roll running on said track, means providing operating connections between said roll and the blank mold for opening and closing the blank mold at predetermined points during the rotation of the mold carriage, means providing operating connections between the said blank mold opening means and the neck mold and controlled by said cam for opening the neck mold after the blank mold has been opened and has traveled a predetermined distance in open position, and manually controlled means for causing the blank mold and the neck mold to be opened and travel in open position independently of the cam track and during a portion of the rotation of the mold carriage in which the blank mold, while under the control of the cam track, is held open and the neck mold closed.

9. A machine for forming hollow glass articles comprising a mold carriage mounted for rotation about a vertical axis, a parison mold mounted thereon and including a sectional blank mold and a sectional neck mold, a stationary cam track, a slide mounted on the mold carriage for reciprocating movement radially of the carriage, means providing operating connections between the slide and the blank mold for opening and closing the blank mold at predetermined points during its rotation with the carriage, a cam roll carried on said slide and running on the cam track, said cam track being shaped and arranged to open the blank mold at a predetermined point during its travel and to impart an additional final opening movement to the blank mold when it reaches a different point in its travel, means providing operating connections between the blank mold opening means and the neck mold for opening the latter when the blank mold is given said final opening movement, and manually controlled means for effecting the opening of the neck mold and blank mold and holding them open independently of the cam track while traversing that portion of their path of rotation during which, while under the control of the cam track, the blank mold is held open and the neck mold remains closed.

10. An Owens type glass blowing machine comprising a mold carriage, means for rotating it, a blank mold and a neck mold mounted on the carriage, a stationary cam track, means providing operating connections between the said track and the molds for opening and closing them at predetermined points during their rotation with the carriage, a fluid operated piston motor, a valve controlling the supply of fluid pressure to said motor, manual means for locking the valve in open position and thereby maintaining fluid pressure within the motor, means actuated by said motor for holding the said molds in open position independently of the cam track while said valve remains open, and automatic means for restoring the control to the cam track when said valve is closed.

11. The combination of a traveling mold carriage, a sectional mold thereon, a stationary cam, means comprising operating connections between the cam and the mold sections for opening and closing the mold at predetermined points during its travel with the carriage, a fluid operated motor, a fluid pressure line extending to the motor, a valve in said line, a latch, means for automatically operating the latch when the mold reaches a predetermined point during its travel with the carriage, means actuated by the latch for operating the valve, and manually operated control means for controlling said latch and holding it out of operative relation to said latch operating means.

12. The combination of a mold carriage, means for rotating it, a sectional mold on the carriage, a stationary cam track, a cam follower roll running on the track, a slide carrying said roll, said slide mounted on the carriage for reciprocating movement radially thereof, means providing operating connections between said slide and mold sections for opening and closing the mold, a fluid operated motor mounted on the carriage, a fluid pressure line extending to the motor, a valve in said line, means operable by said slide to open the valve when the slide reaches a predetermined position, said valve operating means including a latch, means for holding said latch in inoperative position, manual control means for releasing the latch from said holding means, and means actuated by said motor for holding the mold open and out of the control of the cam.

RUSSELL G. ALLEN.